July 15, 1958  K. A. ANDERSON  2,843,267
SEPARATION APPARATUS
Filed June 27, 1955  2 Sheets-Sheet 1

INVENTOR.
KENNETH A. ANDERSON
BY
Pollard Johnston Smythe Robertson
ATTORNEYS

July 15, 1958 K. A. ANDERSON 2,843,267
SEPARATION APPARATUS
Filed June 27, 1955 2 Sheets-Sheet 2
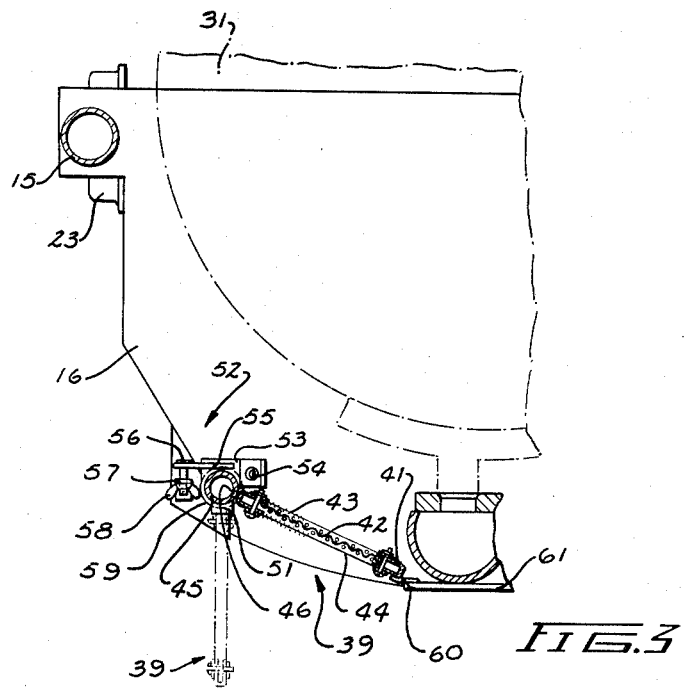
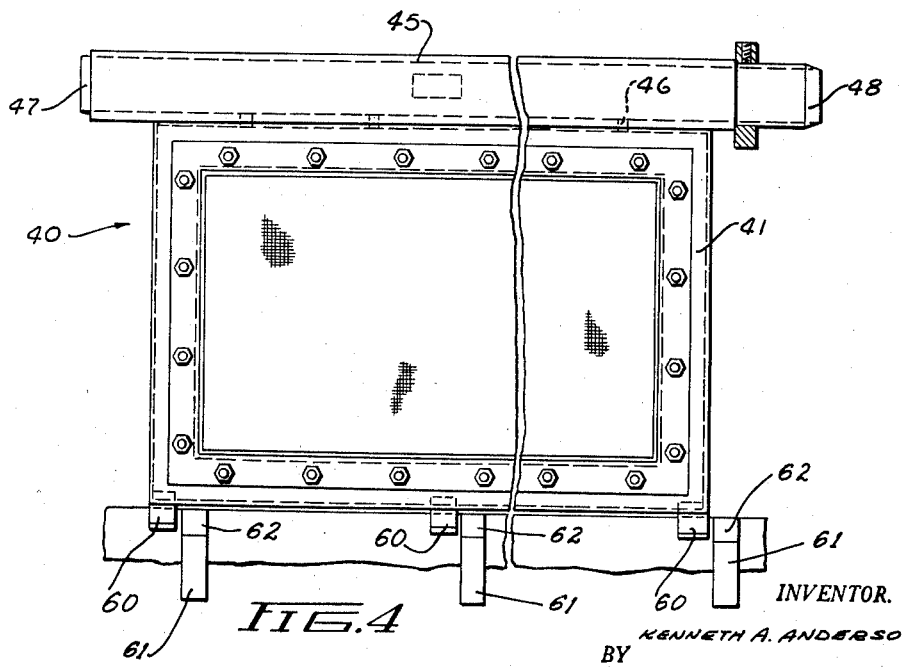
INVENTOR.
KENNETH A. ANDERSON
BY
ATTORNEYS

United States Patent Office

2,843,267
Patented July 15, 1958

2,843,267

SEPARATION APPARATUS

Kenneth A. Anderson, Silvis, Ill., assignor to American Machine and Metals, Inc., New York, N. Y., a corporation of Delaware Application June 27, 1955, Serial No. 518,241

9 Claims. (Cl. 210—236)

This invention relates generally to filter apparatus, and more particularly is directed to improvements in pressure-leaf filters wherein a plurality of filter leaves are normally operable in an enclosure containing the slurry or the like from which a liquid is to be filtered, and either pressure is applied to the enclosure or a vacuum is applied to the manifold with which the leaves communicate, so that liquid is filtered through the leaves into the manifold and filter cake is deposited on the outside surfaces of the filter leaves.

Where it is desired to obtain the rapid recovery or discharge of semi-dry filter cakes, it is preferable to employ a pressure leaf filter having a horizontally extending enclosure or tank provided with a removable wall at one end which is mounted on a carriage or supporting member supporting all of the filter leaves for axial movement into and out of the horizontal tank so that, when the removable end wall is separated axially from the tank to open the filter, the carriage moves the entire leaf battery out of the tank to make it accessible for cleaning. However, in horizontal tank pressure leaf filters, it has been found that a residue of liquid at the bottom of the tank below the level of the lower edges of the usual filter leaves, hereinafter referred to as "primary" filter leaves or elements, cannot be removed by operation of the primary filter leaves, so that a loose slurry remains at the bottom of the tank at the conclusion of the usual filter operation and this loose slurry is discharged when the filter is opened. When the solids are valuable or must be disposed of in dry state, the discharge of the loose slurry is disadvantageous, and it further represents a loss of the liquid to be filtered as well as a problem in maintaining the area around the filter in a clean and safe condition.

Accordingly, it is an object of this invention to provide a pressure leaf filter, preferably of the type having a horizontal tank or enclosure, which is capable of achieving substantially complete separation of the liquids from the solids so that all of the solids may be removed or discharged in either dry or semi-dry state.

In accordance with an aspect of this invention, a pressure leaf filter, preferably of the type having a horizontal tank or enclosure, is provided with a least one scavenger filter leaf or element at the bottom of the tank in addition to the usual primary filter leaves so that, following the operation of the latter, any residue of liquid remaining at the bottom of the tank can be removed or separated from the solids through the scavenger filter leaf or leaves and substantially all of the solids are deposited, in a dry or semi-dry state, as filter cake upon the primary and scavenger filter leaves.

Another object of the invention is to provide a pressure leaf filter having at least one scavenger filter leaf, in addition to the usual or primary filter leaves for the purpose described above, and wherein the scavenger filter leaf or leaves is, or are, arranged in a manner to facilitate the cleaning of filter cake therefrom and so as to avoid interference with cleaning of the primary filter leaves.

One form that a pressure leaf filter embodying the present invention may take is characterized by the provision of a horizontally extending enclosure or tank which is open at one end and adapted to axially receive a movable carriage or supporting member having an end wall for closing the open end of the tank. A series or battery of primary filter leaves extend vertically from a manifold forming a central spine of the carriage, and scavenger filter leaves are pivotally mounted at the bottom of the carriage or supporting member at opposite sides of the latter for sliding or longitudinal movement with the carriage or supporting member into and out of the tank and for swinging movement relative to the carriage between operative, elevated positions, where the scavenger leaves lie close to the bottom of the tank with the carriage within the latter, and depending or downwardly swung cleaning positions, where the scavenger leaves are removed from the tank with the carriage or supporting member and the battery of primary filter leaves on the latter and are out of the way of filter cake being cleaned from the primary leaves.

Another feature of a pressure leaf filter embodying the present invention resides in the fact that the outlet from the manifold receiving liquid from the battery of primary filter leaves may be closed following the separation of the major portion of the liquid from the solids so that further filtration can then occur only through the scavenger filter leaves and, by reason of the reduction in the operative area through which filtration can occur, the pressure within the tank or enclosure builds-up to ensure removal of liquid from the slurry at the bottom of the tank even though the slurry is of a thickness or consistency that would resist filtration under the pressures normally existing within the tank during operation of the primary filter leaves.

The above, and other objects, features and advantages of the invention, will be apparent in the following detailed description of an illustrative embodiment which is to be read in connection with the accompanying drawings, forming a part hereof, and wherein:

Fig. 3 is a fragmentary sectional view taken along the line 3—3 of Fig. 1, but with the outlines of the primary filter leaves shown in broken lines; and Fig. 4 is an enlarged, fragmentary plan view of a scavenger filter leaf and an associated support included in the filter of Figs. 1, 2 and 3.

Figure 1:
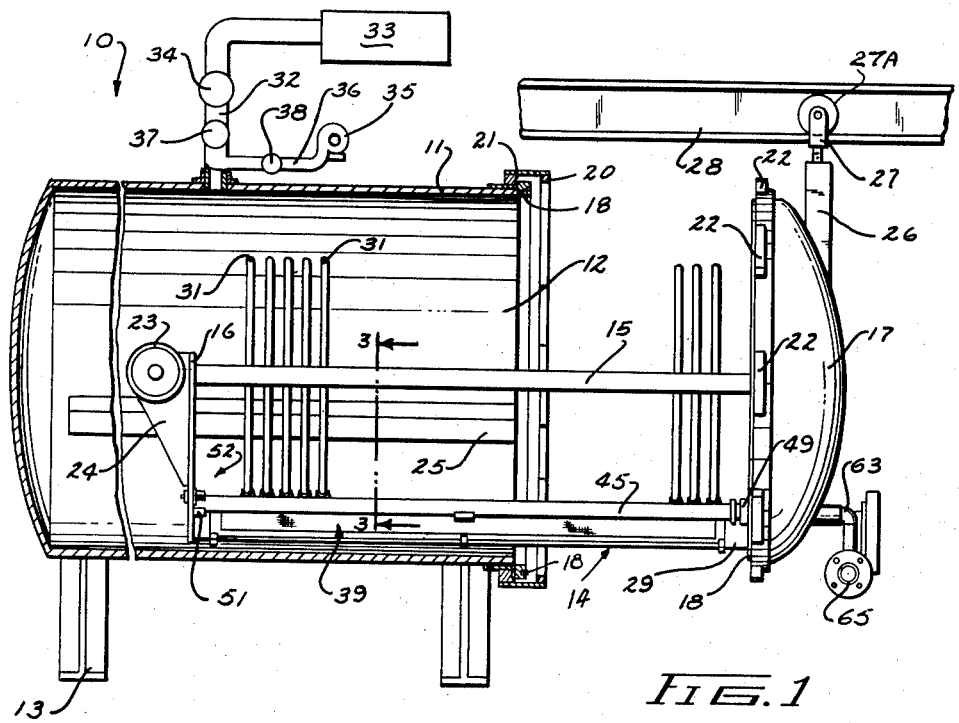
Fig. 1 is a side elevational view, partly broken away and in axial section, of a pressure leaf filter embodying the present invention.

Referring to the drawings in detail, and initially to Fig. 1 thereof, where a pressure leaf filter embodying this invention is generally identified by the reference numeral 10, it will be seen that the filter 10 includes a tank or enclosure 11, preferably extending horizontally, and having an open end 12. The tank 11 may be supported at a convenient height above the floor by suitable legs 13, and is adapted to axially receive a carriage or supporting member, generally identified by the reference numeral 14, through its open end 12.

The carriage or supporting member 14 includes longitudinal frame members 15 extending in parallel and laterally spaced apart relationship between a follower plate 16, at one end of the carriage, and a cover or closure 17, at the other end of the carriage 14, which is adapted to close the open end 12 of tank 11 when the carriage is extended into the latter. In order to provide a seal between the cover 17 and the end 12 of tank 11, a suitable gasket 18 may be provided on the face of cover 17 intended for contact with a radial flange 19 extending around the cover, and securing lugs 20 are mounted on ring 21 extending around the periphery of the open end of the tank and engageable with projections 22 on the cover 17 to hold the latter axially against gasket 18.

In order to support the carriage 14 for movement axially into and out of the tank 11, the carriage preferably has rollers or flanged wheels 23 rotatably mounted on suitable brackets 24 extending from the follower plate 16 and riding on tracks or rails 25 (Fig. 1) which extend along the interior of tank 11 at the opposite sides of the latter, and a hanger 26 extending from the cover 17 and suspended from a trolley 27 which rides along a suitably supported overhead rail 28.

The carriage 14 further includes a main manifold 29 extending longitudinally from the follower plate 16 through the cover 17 at a laterally centralized location adjacent the bottom of the carriage, and the manifold 29 has a longitudinally spaced apart series of receptacles 30 (Fig. 2) in the top thereof to receive the nozzles of related filter leaves 31 which are thereby supported in upstanding, parallel relationship transverse to the longitudinal axis of the carriage and form a battery of primary filter leaves or elements. Each filter leaf 31 may, as is usual, include a frame extending around the perimeter thereof and supporting spaced wire mesh screens through which the filtrate or liquid is filtered into the interior of the leaf, either with the aid of diatomaceous earth, asbestos, purified cellulose, activated carbons and clays, and other filter aids deposited on the screens as a precoating, or with the aid of a cloth bag enveloping the leaf, when a cloth filter medium is required.

After the carriage 14 has been fully extended into the tank 11 and the end 12 of the latter closed by the cover 17, the prefilt or unfiltered liquid is pumped into the tank 11, for example, through a pipe 32 extending from a storage tank 33 and having a pump 34 interposed therein, so that the liquid is forced through the precoats or cloth bags and the screens into the interiors of the leaves 31 for removal through the manifold 29, while the filterable solids are deposited with the filter cake on the exteriors of the leaves.

When the filter cake on the leaves has accumulated to an extent requiring the cleaning or removal thereof, the supplying of prefilt is discontinued, for example, by interrupting the operation of the pump 34, and pressure is applied to the prefilt remaining in the tank 11, for example, by a blower or compressor 35 having its outlet connected to the pipe 32 by a branch pipe 36, with valves 37 and 38 being interposed in the pipe 32 and branch pipe 36, respectively, and alternately opened so that prefilt pumped by pump 34 cannot flow back through the branch pipe 36 and air pumped by the blower 35 cannot flow back through the pump 34 into the storage tank 33. The pressure applied, in the above manner, to the prefilt within the tank 11 will cause the liquid or filtrate to continue to pass into the leaves 31 for removal through manifold 29 until the level of the prefilt in the tank 11 falls below the lower edges of the primary filter leaves 31 which are necessarily raised from the bottom of the tank 11 by the provision of the manifold 29; or until the level falls to an extent such that gas or air is undesirably by-passed through the upper part of the leaves due to the high resistance through the cake still immersed in the unfiltered liquid. Thus, after all filtration possible through the battery of primary filter leaves 31 has been accomplished, a substantial quantity of slurry made-up of filterable solids and some liquid will remain at the bottom of tank 11 so that, when the carriage 14 is withdrawn from the tank to permit cleaning of the exposed filter leaves 31 and recovery or discharge of the filter cake, such slurry will pour from the open end of the tank onto the surrounding floor.

It is apparent that the slurry discharged from the tank in the above manner represents a loss of filtrate and of solids that it is desirable to recover or separate if a high efficiency of filtration is to be obtained, and that the discharged slurry must be cleaned from the surrounding floor area to maintain the latter in a safe and dry condition.

In order to ensure that only dry or semi-dry solids will remain within the tank 11 at the conclusion of the filtration operation, a filter embodying the present invention further includes at least one scavenger filter leaf which is disposed adjacent the bottom of the tank 11 during the operation of the filter so that, after the primary filter leaves 31 have effected the filtration of as much of the liquid as is possible therewith, the scavenger filter leaf or leaves is, or are, operated to further separate or filter liquid from the slurry remaining at the bottom of the tank. Thus, substantially all of the liquid can be removed from the tank 11 prior to the opening thereof and the solids that do not contribute to the filter cake on the primary filter leaves either form part of the filter cake on the scavenger leaf or leaves or collect in dry or semi-dry state on the bottom surface of the tank 11 from which the solids can be easily removed.

In the embodiment of the invention illustrated in the drawings, the filter 10 includes two scavenger filter leaves generally identified by the reference numerals 39 and 40, respectively. Referring to Figs. 3 and 4, it will be seen that each of the scavenger filter leaves 39 and 40 includes a rectangular, hollow frame 41 holding a coarse mesh spacer screen 42 (Fig. 3) and fine mesh filter screens 43 and 44 disposed at the opposite sides of the screen 42 and spaced apart by the latter. A tubular member 45 extends along the outer edge of one of the long sides of rectangular frame 41 and is secured to the latter, for example, by welding. The tubular member 45 has a longitudinal extending series of apertures 46 (Fig. 3) therein opening into the interior of the hollow frame 41, while one end of the member 45 is closed, as at 47, by an end wall, so that liquid filtered through the screens 43 and 44, which may be employed with or without the usual precoat thereon, into the interior of the scavenger leaf may be withdrawn from the latter through the open end 48 of the tubular member 45. The tubular member 45 further is intended to serve as an axle for pivotal mounting of the related scavenger filter leaf on the carriage 14.

Figure 2:
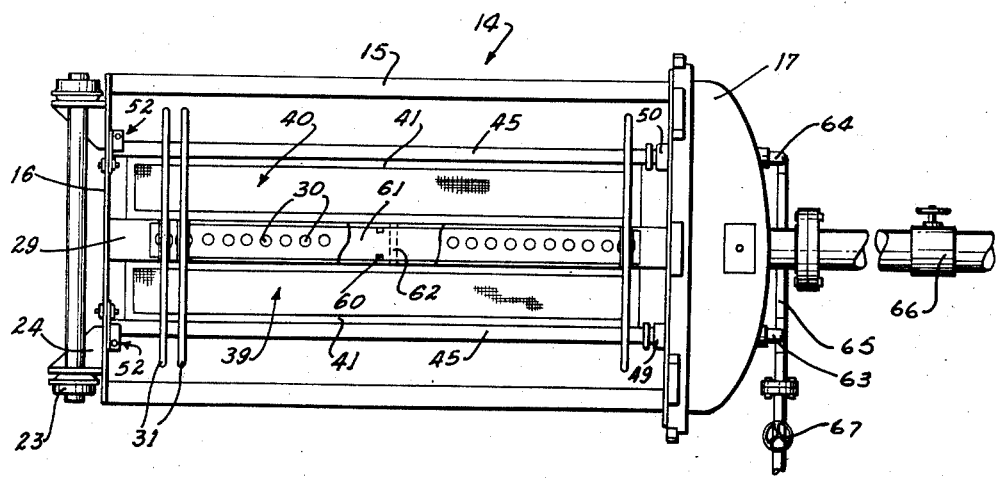
Fig. 2 is a top plane view of a carriage including a leaf and manifold assembly which forms part of the filter of Fig. 1 and which is shown partly broken away and with a number of the primary filter leaves removed for the purpose of clarity.

As seen in Figs. 1 and 2, pipe sections 49 and 50 extend through the cover 17 at locations adjacent the bottom of the latter and at opposite sides of, and spaced from, the longitudinal, vertical medial plane of the carriage 14 to slidably and rotatably receive the front or open ends 48 of the tubular members 45 of scavenger leaves 39 and 40, respectively. Suitable sealing rings of packings (not shown) are provided within the pipe sections 49 and 50 to prevent leakage of liquid out of the joints between such pipe sections and the related tubular members 45.

The tubular members 45 of the scavenger leaves 39 and 40, at their back or closed ends 47, are slidably and rotatably borne by supporting pads 51 having arcute upper surfaces conforming to the curvature of the outer surfaces of the members 45 and mounted on the front face of the follower plate 16 substantially in longitudinal alignment with the pipe sections 49 and 50, respectively. The back or closed ends 47 of the tubular members 45 are held on the arcuate upper surfaces of the related pads 51 by suitable clamp assemblies which are generally identified by the reference numerals 52. As seen in Fig. 3, each of the clamp assemblies 52 may include an arm 53 pivoted, as at 54, on the follower plate 16 for swinging in a plane parallel to the latter and having a portion 55 extending normal to the plane of movement of arm 53 so that, when the latter is substantially horizontal, as shown, the arm 53 extends behind the closed end of the member 45 and the portion 55 overlies and bears downwardly upon the closed end portion of the related tubular member 45. A bolt 56 extends through suitable apertures in the portion 55 and in a lug 57 carried by the follower plate 16, and a wing nut 58 is threaded on the bolt 56 so that the latter holds the arm 53 in the illustrated position where it prevents the lifting of the member 45 off its related pad and limits the axial movement of the member 45, in the direction away from cover 17, to a position where the front or open end 48 of member 45 is still engaged in the related pipe section 49 or 50. In order to permit removal or replacement of the scavenger filter leaves 39 and 40, the follower plate 16 has openings 59 (Fig. 3) therein aligned with the tubular members 45 of the related scavenger leaves and normally obstructed by the arms 53 of the clamp assemblies 52. However, when the arm 53 is released and swings upwardly from the position of Fig. 3 to completely uncover the related opening 59, the related tubular member 45 can be displaced axially away from the cover 17 to an extent projecting the closed end of member 45 through the opening 59 and withdrawing the front end 48 from the related pipe section 49 or 50. Then, the tubular member 45 can be tilted and moved toward the cover 17 to withdraw the back or closed end 47 from the related opening 59, whereupon, the scavenger filter leaf is free of the remainder of the carriage 14 and can be replaced.

Although the scavenger filter leaves 39 and 40 are swingable about axes defined by the related tubular members 45 and also displaceable longitudinally relative to the remainder of the carriage structure, the scavenger filter leaves are normally held in operative positions where they incline downwardly at acute angles from the horizontal in the directions toward the center or medial plane of the carriage, as shown in full lines on Fig. 3, so that, when the carriage 14 is fully inserted into the tank 11, the scavenger filter leaves 39 and 40 will lie close to the bottom of the tank.

In order to releasably hold the scavenger filter leaves 39 and 40 in the operative positions described above, each frame 41 has a plurality of lugs or latch members 60 extending from the inner long side thereof, that is, from the long side opposed to that having the tubular member 45 therealong, and leaf supports 61 (Figs. 3 and 4) are secured to the bottom of and spaced along the manifold 29 so that the lugs 60 normally rest on, and are supported by, leaf supports or lugs 61. Thus, longitudinal displacement of the scavenger leaves relative to the remainder of the carriage 14 in the direction toward the cover 17 serves to register the lugs 60 with the related leaf support, whereby the scavenger leaves are held in place. Upon longitudinal displacement of the scavenger leaves away from the cover relative to carriage 14, the lugs 60 will be displaced from register with the leaf supports 61 and permit the scavenger filter leaves to depend vertically from their related swinging axes in cleaning positions which, with respect to the leaf 39, is represented in broken lines on Fig. 3.

Referring to Figs. 1 and 2, it will be seen that the pipe sections 49 and 50, at their ends projecting forwardly from the cover 17, are connected by elbows 63 and 64, respectively, to a manifold 65 through which the filtrate from the scavenger leaves 39 and 40 can be transported to a storage receptacle. Further, valves 66 and 67 are interposed in suitable extensions of the manifolds 29 and 65, respectively, so that such manifolds can be individually opened to permit the flow of filtrate therethrough.

In operating the above described filter embodying this invention, the valve 66 is normally open until the extent of filtration possible with the battery of primary filter leaves has been accomplished. Since the total area of the leaves 31 through which filtration can occur is relatively large, the resistance to normal filtration is relatively low, and the pressure in the tank 11 is correspondingly substantially below the pressure that can be generated by the blower 35. However, when the valve 66 is closed to render the primary filter leaves inoperative and the valve 67 is opened to effect operation of the scavenger filter leaves 39 and 40 for removing liquid from the slurry or sludge remaining at the bottom of tank 11, the relatively small combined filtering area of the scavenger leaves causes the pressure within the tank to build-up toward that generated by the blower 35 so that the removal of liquid from the slurry or sludge is effected under increased pressure thereby to ensure complete separation of the liquid or filtrate from the solids even though the thickness of the slurry or sludge at the bottom of the tank would resist further filtration at the normal pressures existing within the tank during the operation of the primary filter leaves 31.

Although positive pressure is applied to the tank 11 in the pressure leaf filter 10 in order to produce a pressure drop between the pressure in the tank and that within the filter leaves for promoting the passage of filtrate through the filter medium into the leaves, the same result can be achieved by venting the tank to the atmosphere and connecting the manifolds 29 and 65 to a source of vacuum.

After all of the liquid has been removed from the slurry or sludge at the bottom of tank 11 by the operation of the scavenger leaves 39 and 40, the cover 17 is released, and the carriage 14 is moved along the rails 25 and 28 in the direction drawing the battery of primary filter leaves 31 and the scavenger leaves 39 and 40 out of the tank 11. The follower plate 16 preferably has a lower, arcuate edge portion which conforms to the corresponding portion of the inner surface of tank 11, so that, during the withdrawal of the carriage from the tank, any solids remaining on the bottom of the latter are scraped out by the follower plate.

When the carriage 14 has been withdrawn from the tank 11 to an extent sufficient to dispose the frames 41 of the scavenger leaves 39 and 40 completely outside of the tank, the leaves 39 and 40 are shifted longitudinally relative to the remainder of the carriage in order to release the lugs 60 from the support 61, whereupon the scavenger leaves drop to their vertical cleaning positions and can be struck and scraped to conveniently remove the filter cake therefrom. Further, when the scavenger leaves are in their vertical, cleaning positions, they do not interfere with the cleaning of the primary filter leaves 31 and permit the filter cake removed from the latter to fall freely into a suitable receptacle therebelow (not shown).

After cleaning of the filter leaves, the leaves 39 and 40 are again restored to their operative positions with the lugs 60 resting on the support 61, and the carriage can then be returned into the tank 11 for resumption of the filtering operation.

Although no mechanism is illustrated in the drawings for effecting movement of the carriage 14 into and out of the tank 11, it is to be understood that a manually, or electric motor, driven windlass may be provided for that purpose.

Further, although a particular embodiment of the invention has been described in detail herein and shown in the accompanying drawings, merely by way of example, it is to be understood that the invention is not limited to that particular embodiment, and that various changes and modifications may be effected therein without departing from the scope or spirit of the invention, except as defined in the appended claims.

What is claimed is:

1. A pressure leaf filter comprising a horizontal tank open at one end, a carriage movable longitudinally into and out of said tank through said open end of the latter and supporting a battery of vertically extending, primary filter leaves, a cover adapted to close said open end of the tank when said carriage is moved into said tank to dispose said primary filter leaves within the latter, means for normally operating said primary filter leaves within said tank so that solids are deposited on the surfaces of said leaves and filtrate enters the leaves for removal from the tank through a manifold connected to said primary filter leaves, and at least one scavenger filter-leaf pivotally mounted on said carriage for bodily movement with the latter into and out of said tank and for swinging between a vertical, cleaning position depending below said battery of primary filter leaves and an operative position extending under said battery and in which said scavenger filter leaf extends along the bottom of the tank, when the carriage is moved into the latter, and is operable to remove filtrate from the slurry remaining at the bottom of the tank after the operation of said primary filter leaves so that said cover can then be removed and the carriage withdrawn from the tank to expose the leaves for cleaning without encountering the discharge of wet materials from the open end of the tank.

2. A pressure leaf filter comprising a horizontal tank open at one end, a carriage movable longitudinally into and out of said tank through said open end of the latter and supporting a battery of vertically extending, primary filter leaves, a cover adapted to close said open end of the tank when said carriage is moved into said tank to dispose said primary filter leaves within the latter, means for normally operating said primary filter leaves within said tank so that solids are deposited on the surfaces of said leaves and filtrate enters the leaves for removal from the tank through a manifold connected to said primary filter leaves, and at least one scavenger filter leaf pivotally mounted on said carriage for swinging between operative and cleaning positions and also capable of limited movement with respect to the carriage in the direction of the pivotal axis of the scavenger leaf, the scavenger filter leaf, when in its operative position, extending under said battery of primary filter leaves and adapted to extend along the bottom of said tank and, when in its cleaning position, depending vertically below said primary filter leaves to facilitate removal of filter cake from the scavenger leaf and to afford easy access to the primary filter leaves for cleaning of the latter, said scavenger filter leaf being operable, when in said operative position within said tank, to remove filtrate from the slurry remaining at the bottom of the tank after the operation of said primary filter leaves so that said cover can then be removed and the carriage withdrawn from the tank to expose the primary and scavenger filter leaves for cleaning without encountering the discharge of wet materials from the open end of the tank.

3. A pressure leaf filter comprising a horizontal tank open at one end, a carriage movable longitudinally into and out of said tank through said open end of the latter and including a manifold extending longitudinally at the bottom of the carriage and supporting a battery of vertically extending, primary filter leaves, a cover adapted to close said open end of the ttank when said carriage is moved into the tank to dispose said primary filter leaves within the latter, means for normally operating said primary filter leaves within said tank so that solids are deposited, as filter cake, on the surfaces of said leaves and filtrate enters said leaves for removal from said tank by said manifold, and two generally rectangular scavenger filter leaves mounted on said carriage to extend under said battery of primary filter leaves at the opposite sides of said manifold so that, when said carriage is extended into said tank, said scavenger filter leaves are disposed along the bottom of the tank and operable to remove liquid from any slurry remaining at the bottom of the tank following the normal operation of said battery of primary filter leaves.

4. A pressure leaf filter comprising a horizontal tank open at one end, a carriage movable longitudinally into and out of said tank through said open end of the latter and including a manifold extending longitudinally at the bottom of the carriage and supporting a battery of vertically extending, primary filter leaves, a cover adapted to close said open end of the tank when said carriage is moved into the tank to dispose said primary filter leaves within the latter, means for normally operating said primary filter leaves within said tank so that solids are deposited, as filter cake, on the surfaces of said leaves and filtrate enters said leaves for removal from said tank by said manifold, and two generally rectangular scavenger filter leaves swingably mounted on said carriage at opposite sides of said manifold for swinging between operative positions, wherein the scravenger filter leaves extend generally horizontally under the battery of primary filter leaves and are operable to remove liquid from any slurry remaining at the bottom of the tank following normal operation of the primary filter leaves, and cleaning positions, wherein said scavenger filter leaves depend vertically from the carriage at laterally spaced apart locations to facilitate cleaning of the scravenger filter leaves and to afford easy access to the primary filter leaves for cleaning of the latter.

5. A pressure leaf filter comprising a horizontal tank open at one end, a carriage movable longitudinally into and out of said tank through said open end of the latter and including a manifold extending longitudinally at the bottom of the carriage and supporting a battery of vertically extending, primary filter leaves, a cover adapted to close said open end of the tank when said carriage is moved into the tank to dispose said primary filter leaves within the latter, means for normally operating said primary filter leaves within said tank so that solids are deposited, as filter cake, on the surfaces of said leaves and filtrate enters said leaves for removal from said tank by said manifold, two generally rectangular scavenger filter leaves each including a tubular member extending along one of the relatively long edges thereof and communicating with the interior of the related scavenger leaf, means on said carriage at opposite sides of said manifold rotatably supporting said scavenger filter leaves by said tubular members of the latter so that said scavenger filter leaves are swingable between operative positions, wherein they extend generally horizontally under the battery of primary filter leaves and are operable to remove liquid from any slurry remaining at the bottom of the tank following operation of said primary filter leaves and to discharge the removed liquid through said tubular members, and cleaning positions, wherein the scavenger filter leaves depend vertically from the related tubular members to facilitate cleaning of the scavenger filter leaves and to afford easy access to the primary filter leaves for cleaning of the latter, and releasable means operative to hold said scavenger filter leaves in said operative positions thereof.

6. A pressure leaf filter comprising a horizontal tank open at one end, a carriage having a cover and a follower plate at its opposite ends and adapted to extend longitudinally into said tank through said open end and to close the latter with said cover, a manifold extending longitudinally of said carriage at the bottom of the latter and supporting a battery of vertically extending primary filter leaves for disposal in said tank and operable therein to remove filtrate from prefilt delivered to said tank and to discharge the removed filtrate from said tank through said manifold, two generally rectangular scavenger filter leaves each having a tubular member extending along one of the longitudinal edges thereof and communicating with the interior of the related scavenger leaf, longitudinally aligned bearing means on said cover and follower plate at opposite sides of said manifold and spaced laterally from the latter, said bearing means receiving the opposite end portions of said tubular members of the scavenger filter leaves and supporting the latter for swinging about the axis of the related tubular member and for longitudinal movement relative to said carriage in the direction of said axis, said scavenger leaves being swingable between operative positions, wherein they extend laterally inward from the related tubular members under said battery of primary filter leaves and are operable to remove liquid from any slurry remaining at the bottom of said tank after the operation of said primary filter leaves, and cleaning positions, wherein said scavenger leaves depend vertically from the related tubular members to facilitate cleaning of the scavenger leaves and to afford free access to said primary filter leaves for cleaning of the latter, and means normally holding said scavenger filter leaves in their operative positions and being releasable by longitudinal movement of the scavenger leaves relative to said carriage.

7. A pressure leaf filter according to claim 6; wherein said bearing means for each scavenger filter leaf includes a pipe section extending through said cover and telescopically engaging the adjacent end portion of the related tubular member, a pad carried by said follower plate and engaging under the adjacent end of the related tubular member, said follower plate having an opening adjacent each pad and adapted to receive an end portion of the related tubular member when the latter is axially displaced in the direction for effecting its disengagement from the related pipe section so that the scavenger filter leaf can then be removed bodily from the carriage, and clamp means operative to hold the related tubular member on said pad and to obstruct said opening in the follower plate so that disengagement of said tubular member from said pipe section is normally prevented, said clamp means being movable to an inoperative position freeing said tubular member and exposing the related opening of the follower plate.

8. A pressure leaf filter according to claim 6; wherein said releasable means normally holding the scavenger filter leaves in their operative positions includes support means on said carriage, and lugs extending laterally from the long sides of said rectangular scavenger leaves remote from said tubular members and adapted to rest on said support means, said support means receiving the related lugs of said scavenger filter leaves, for holding said scavenger filter plates in operative position, said scavenger filter leaves being longitudinally displaceable relative to each other to free the scavenger leaves for swinging to their cleaning positions.

9. A pressure leaf filter comprising a horizontal tank open at one end, a supporting member movable longitudinally relative to and into and out of said tank through said open end of the latter and supporting a battery of vertically extending, primary filter leaves, a cover adapted to close said open end of the tank when said supporting member is in said tank to dispose said primary filter leaves within the latter, means for normally operating said primary filter leaves within said tank so that solids are deposited on the surfaces of said leaves and filtrate enters the leaves for removal from the tank through a manifold connected to said primary filter leaves, and at least one scavenger filter leaf pivotally mounted on said supporting member for swinging between a vertical, cleaning position relative to said battery of primary filter leaves and an operative position extending under said battery, and in which said scavenger filter leaf extends along the bottom of the tank, when the supporting member is in the latter, and is operable to remove filtrate from the slurry remaining at the bottom of the tank after the operation of said primary filter leaves so that said cover can then be removed and the supporting member withdrawn relative to the tank to expose the leaves for cleaning without encountering the discharge of wet materials from the open end of the tank.

References Cited in the file of this patent
UNITED STATES PATENTS

| | | |
|---|---|---|
| 864,308 | Kelly | Aug. 27, 1907 |
| 1,350,433 | Atkins | Aug. 24, 1920 |
| 2,221,210 | Soderquist | Nov. 12, 1940 |
| 2,732,079 | Hunziker | Jan. 24, 1956 |